United States Patent
Baxter et al.

(10) Patent No.: US 6,304,710 B1
(45) Date of Patent: Oct. 16, 2001

(54) INTEGRATED OPTICAL DEVICE PROVIDING ATTENUATION

(75) Inventors: Stephen Mark Baxter, Chester; James Stuart McKenzie, Uxbridge, both of (GB)

(73) Assignee: Bookham Technology plc, Abingdon (GB)

( * ) Notice: Subject to any disclaimer, the term of this patent is extended or adjusted under 35 U.S.C. 154(b) by 0 days.

(21) Appl. No.: 09/306,437

(22) Filed: May 6, 1999

(30) Foreign Application Priority Data

Jul. 7, 1998 (GB) .................................................. 9814734

(51) Int. Cl.⁷ ...................................................... G02B 6/00
(52) U.S. Cl. .......................... 385/140; 385/129; 385/130; 385/37; 385/14
(58) Field of Search .................................. 385/14, 15, 31, 385/38, 129, 130, 131, 140, 37

(56) References Cited

U.S. PATENT DOCUMENTS

| 4,715,027 | * | 12/1987 | Mahapatra et al. | 385/14 X |
| 4,986,627 | * | 1/1991 | Boscher et al. | 385/140 |
| 5,078,513 | | 1/1992 | Spaulding et al. | 385/14 |
| 5,093,884 | | 3/1992 | Gidon et al. | 385/132 |
| 5,114,513 | | 5/1992 | Hosokawa et al. | 156/150 |
| 5,228,103 | * | 7/1993 | Chen et al. | 385/14 |
| 5,410,622 | * | 4/1995 | Okada et al. | 385/14 |
| 5,657,407 | * | 8/1997 | Li et al. | 385/37 |

FOREIGN PATENT DOCUMENTS

| 0 397 337 | 4/1990 | (EP) | 385/14 X |
| 0 595 080 A1 | 10/1993 | (EP) | 385/14 X |
| 63-147112 | 6/1988 | (JP) | 385/14 X |

* cited by examiner

Primary Examiner—Brian Healy
(74) Attorney, Agent, or Firm—Fleshner & Kim, LLP

(57) ABSTRACT

The application describes the addition of serrations to the edge of the light transmissive layer of an integrated optical device. This enables scattered background light to be coupled out of the device, improving the signal-to-noise ratio.

27 Claims, 4 Drawing Sheets

INTEGRATED OPTICAL DEVICE PROVIDING ATTENUATION

TECHNICAL FIELD

This invention relates to integrated optical devices such as integrated silicon waveguides for use in optical circuits.

BACKGROUND ART

Integrated optical devices can include silicon waveguides formed on the upper surface of a silicon wafer. FIG. 1 shows such a construction, in which a rib waveguide 10 is formed on a layer of silicon 12. The silicon layer 12 is silicon-on-insulator, having been grown epitaxially over a silica layer 14 within a silicon wafer 16. The entire waveguide is coated for protective purposes with the silica layer 18. As a result, light propagates within the waveguide 10.

The actual distribution of optical energy is in fact within the zone 20. This extends within the upstanding waveguide rib 10, but is principally within the SOI layer 12 and does in fact extend slightly either side of the waveguide rib 10.

Some stray light will inevitably be lost from the waveguide. This will normally propagate within the SOI layer 12, being retained therein by internal reflection. Eventually it may be reflected into a receiver photodiode present on the chip, thus increasing the cross talk signal and decreasing the signal to noise ratio for the device as a whole. The performance of the device could therefore be improved by eliminating such stray light.

It is known to provide locally doped areas within the SOI layer. These act as absorbent areas for stray light, which is then dissipated as heat.

DISCLOSURE OF INVENTION

The present invention provides an integrated optical component comprising a light transmissive layer, the layer having at least one serration formed along an edge thereof, thereby to cause multiple internal reflection of light and hence attenuation thereof.

Such serrations will provide alternative angles for the internal light to be reflected, with minimised perpendicular reflections. Serrations also generate multiple reflections for the stray light, at least some of which will be lossy. These effects will reduce the proportion of stray light which is returned to the active region of the device.

It is clearly preferred that there are a plurality of such serrations along the edges of the light transmissive layer. It may be possible to design the layer such that the majority of the scattered light is captured by a smaller number of suitably located serrations. However, it is preferred if substantially all edges of the layer include serrations. The serrations can be substantially uniform. However, it may in particular designs be preferable to arrange the serrations non-uniformly, for example at a variety of angles.

As the angles subtended by the convergent sides of the serration decreases, so the likelihood of an incoming beam becoming trapped within the serration increases. During such trapping light beams will undergo multiple reflections, all of which will incur some attenuation. For this reason, it is preferred that this angle, hereinafter referred to as $\alpha$, is minimised. A preferred maximum is twice the critical angle of internal reflection of the material of the light transmissive layer (hereinafter $\theta_c$). When $\alpha$ is below this angle, any beam which succeeds in reflecting internally into the serration must be channelled towards the tip, its angles of incidence at successive reflections decreasing. Eventually, the angle of incidence may decrease sufficiently for near complete refraction to take place, coupling the beam out of the transmissive layer.

The usual material for the light transmissive layer is silicon, usually presented as silicon-on-insulator. A typical insulator is silica. The refractive index of silicon is approximately 3.5, giving a critical angle of approximately 17° (ignoring the effect of any protective layers of silica).

BRIEF DESCRIPTION OF DRAWINGS

Embodiments of the present invention will now be described, by way of example, with reference to the accompanying figures, in which;

FIG. 1 has been described already, and therefore no further description will be given herein.

FIGS. 2, 3 and 4 show a first embodiment of the present invention. The silicon wafer 16 includes a silica insulation layer 14, on top of which is an epitaxial silicon transmissive layer 12. For clarity, the silica protective layer 18 has not been illustrated. At the edge of the silicon transmissive layer 12, a plurality of serrations 22 are provided. These can be formed straightforwardly by etching the upper silicon layer by way of a suitable mask.

FIG. 3 shows the angle of the convergent sides of the serration, marked as $\alpha$.

FIG. 5 shows a second example in which $\alpha$ is very much smaller. The advantage of this will be apparent from the description to follow.

FIG. 6 shows a third embodiment in which the serrations are rounded, but still subtend an angle $\alpha$ along the roughly straight portion. Whilst this arrangement is likely to be slightly less efficient, it may be easier to manufacture.

FIG. 7 illustrates a principle by which the invention is considered to work. It is necessary to consider a single serration 22 and an incoming scattered light beam 24, arriving at an angle which is in principle random. This will make an angle of incidence $\theta$ with one edge of the serration 22, and the beam will be internally reflected at the edge of the serration. It will then meet the opposite edge of the serration at an angle of $\theta$-$\alpha$, i.e. significantly less than its original angle of incidence. In the case illustrated in FIG. 7, the angle of incidence $\theta$-$\alpha$ is less than the critical angle and a significant proportion of the light beam 24 will therefore escape by refraction. Thus, the power of the reflected part of the light travelling on inside the transmissive layer is strongly attenuated.

Figure 1:
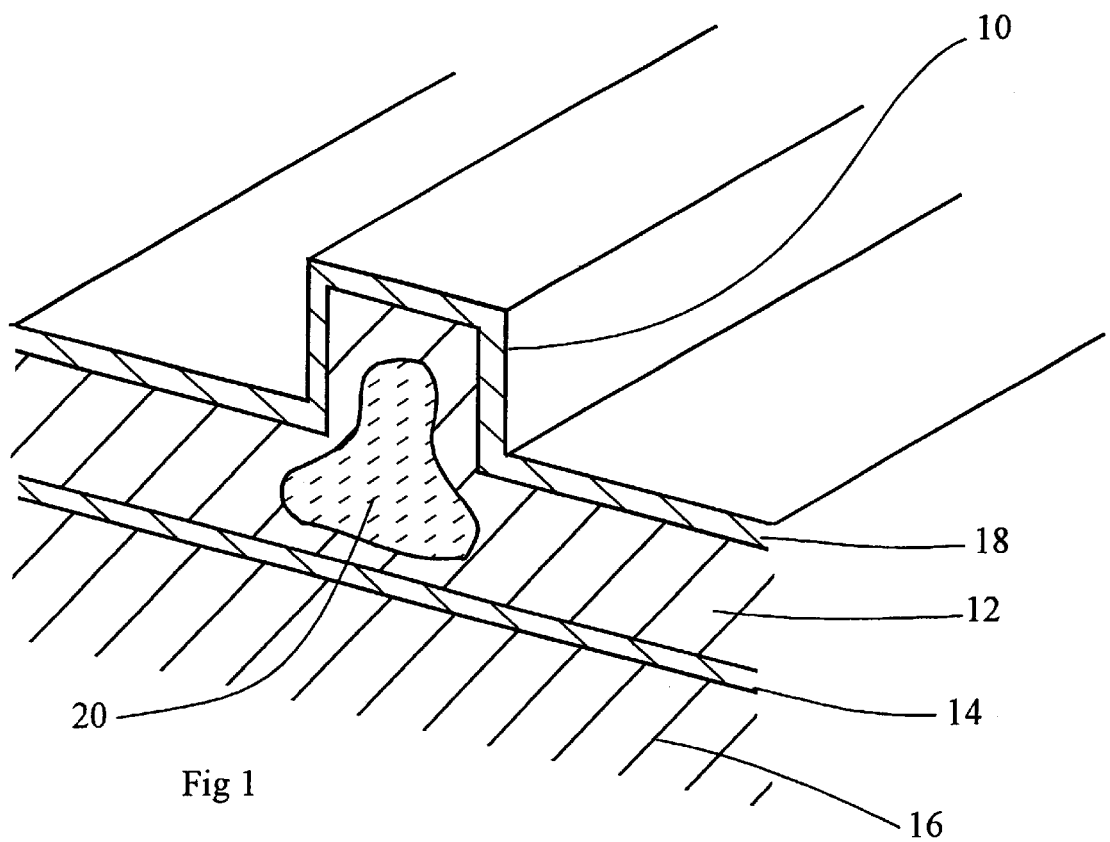
FIG. 1 is a perspective view of a SOI waveguide structure.
Figure 2:
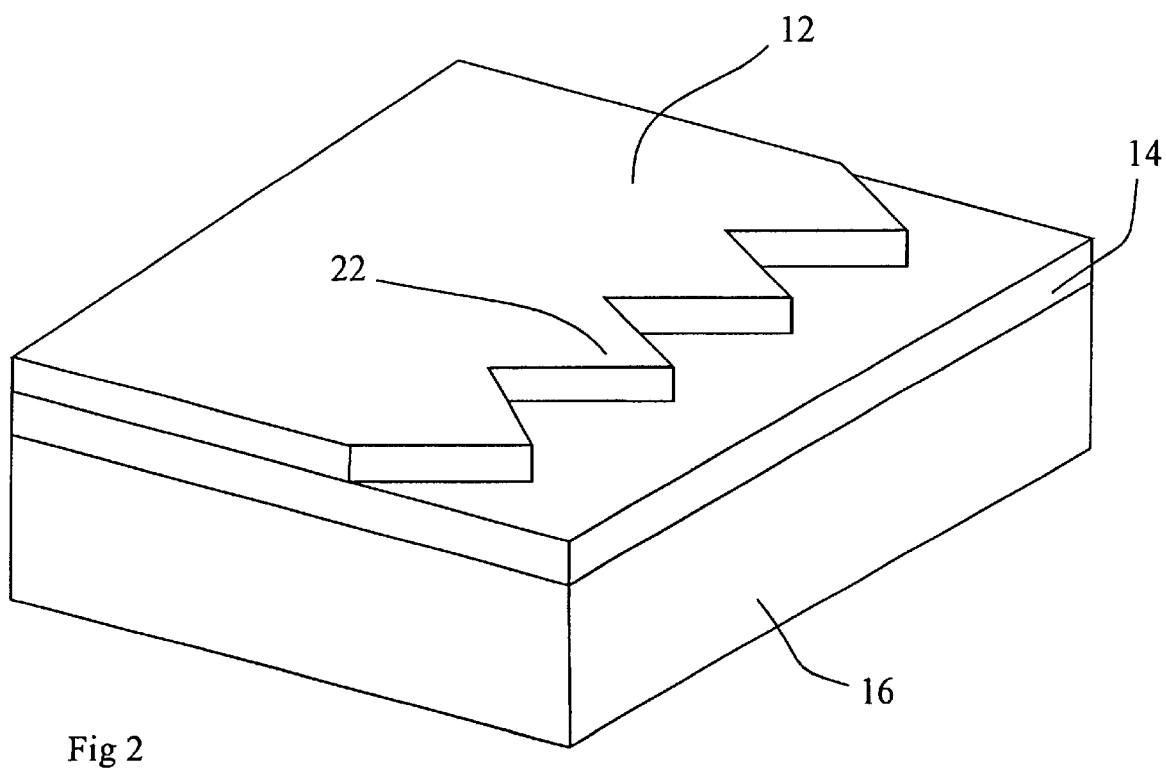
FIG. 2 is a perspective view of a first embodiment of the present invention.
Figure 3:
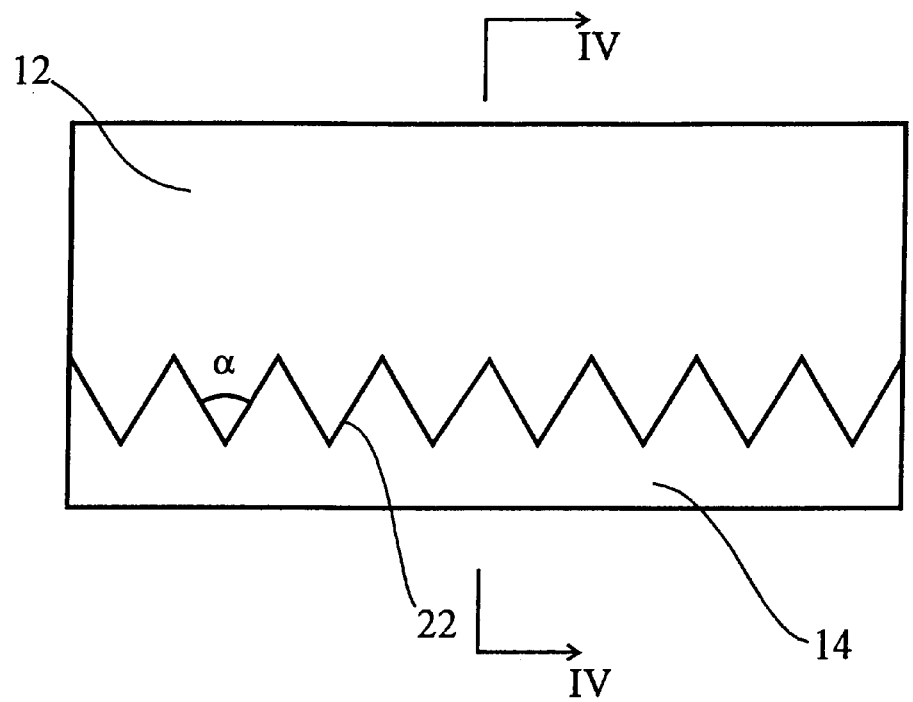
FIG. 3 is a top view of the embodiment of FIG. 2.
Figure 4:
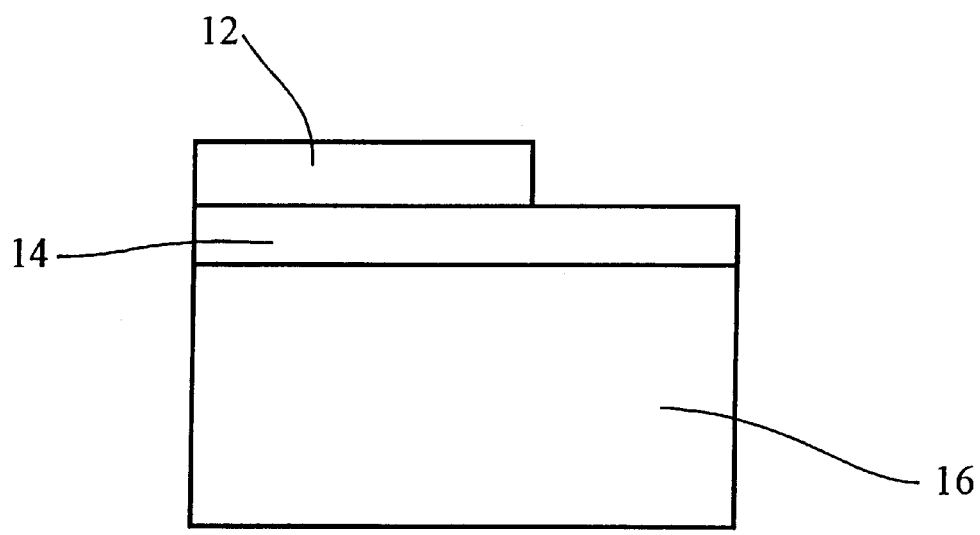
FIG. 4 is a vertical section through IV—IV of FIG. 3.
Figure 5:
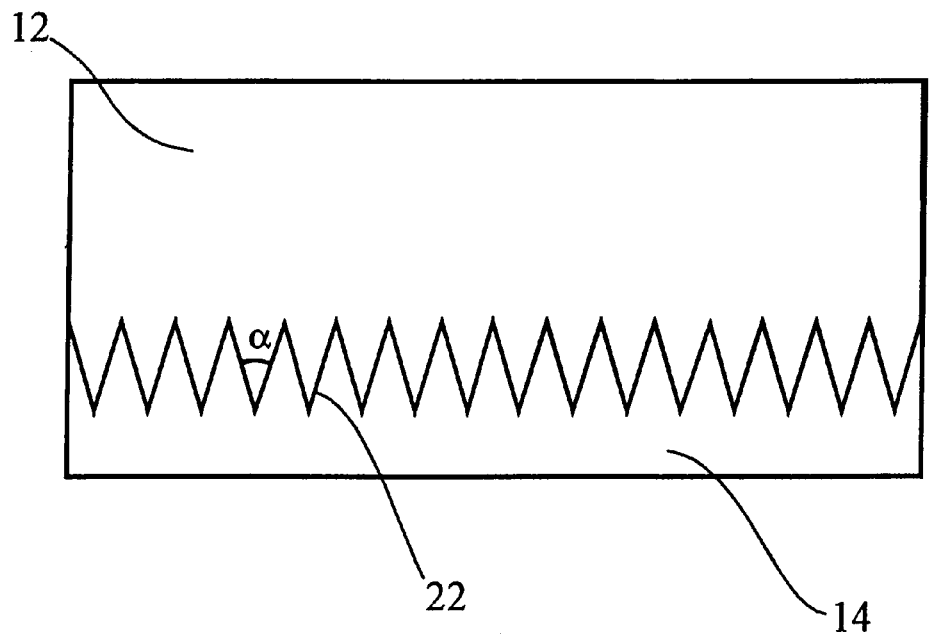
FIG. 5 is a top view of a second embodiment of the present invention.
Figure 6:
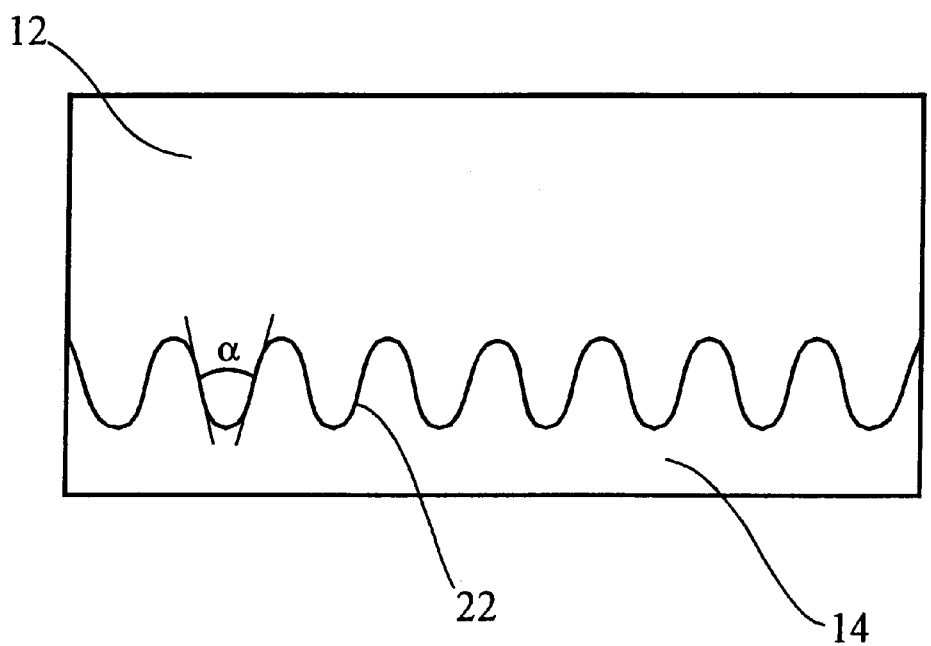
FIG. 6 is a top view of a third embodiment of the present invention.
Figure 7:
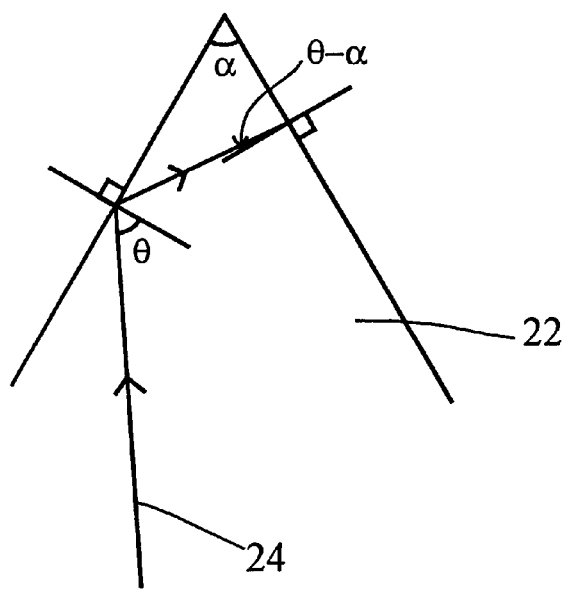
FIGS. 7 and 8 illustrate the operation of the present invention.

Some incident angles may result in total internal reflection at both sides and still be reflected back into the transmissive layer. However, these are likely to be substantially refracted out at a further edge of the chip, particularly if the chip edges are non-perpendicular or if the serrations are not all aligned substantially parallel as illustrated in FIGS. 3, 5 and 6.

Figure 8:
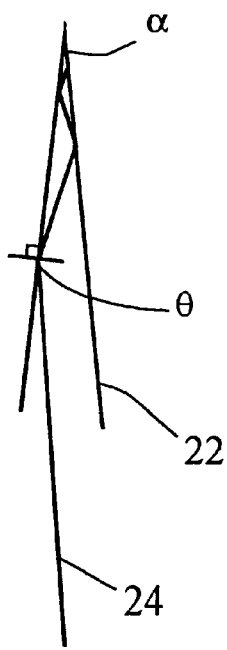

FIG. 8 illustrates the advantage of decreasing $\alpha$. An incoming beam 24 is still internally reflected at the first edge of the serration 22. Having struck the first edge at a more glancing angle, θ is therefore larger and, α being smaller, θ-α is likely to remain above the critical angle. However, the geometry of this situation means that the next successive reflection leaves the beam 24 still directed toward the tip of the serration 22. As reflection continues, θ-nα will eventually become less than the critical angle. Further multiple reflections become steadily more lossy. Most of the beam may therefore eventually couple out of the serration, but by then it will have experienced several lossy reflections such that both the light remaining inside the transmissive layer and the one emitted into the device package will be strongly attenuated.

Thus, through the present invention, a beam of stray light will be subjected to multiple reflections at each chip edge that it meets. Undergoing such reflective and (in particular) refractive processes will compound the attenuation effect and result in a high total attenuation.

What is claimed is:

1. An integrated optical circuit formed on an optical chip comprising:
   a light transmissive layer;
   one or more optical devices integrated in said layer;
   at least one serration formed along an edge of said layer arranged such that stray light lost from the one or more optical devices incident upon said at least one serration at the edge of the layer undergoes multiple internal reflection within the serration until substantially all the light is transmitted from said serration out of said layer.

2. An integrated optical component according to claim 1 wherein there are a plurality of such serrations along the edges of the light transmissive layer.

3. An integrated optical component according to claim 2 wherein substantially all edges of the layer include serrations.

4. An integrated optical component according to claim 2 wherein the serrations are substantially uniform.

5. An integrated optical component according to claim 2 wherein the serrations are arranged non-uniformly.

6. An integrated optical component according to claim 5 wherein the serrations are arranged at a variety of angles.

7. An integrated optical according to claim 1 wherein the angle subtended by the convergent sides of the serration (α), is at most twice the critical angle of internal reflection of the material of the light transmissive layer.

8. An integrated optical component according to claim 1 wherein the transmissive layer is of silicon.

9. An integrated optical component according to claim 8 being a silicon-on-insulator device.

10. An integrated optical circuit formed on an optical chip, comprising:
    a light transmissive layer including at least one waveguide and at least one active optical component, the waveguide being adapted to direct light to the component;
    one or more optical devices integrated in said layer; and
    at least one serration formed along an edge of said layer arranged such that stray light lost from the one or more optical devices incident upon said at least one serration at the edge of the layer undergoes multiple internal reflection within the serration until substantially all the light is transmitted from said serration out of said layer.

11. An integrated optical component according to claim 10 wherein there are a plurality of such serrations along the edges of the light transmissive layer.

12. An integrated optical component according to claim 11 wherein substantially all edges of the layer include serrations.

13. An integrated optical component according to claim 11 wherein the serrations are substantially uniform.

14. An integrated optical component according to claim 11 wherein the serrations are arranged non-uniformly.

15. An integrated optical component according to claim 14 wherein the serrations are arranged at a variety of angles.

16. An integrated optical according to claim 10 wherein the angle subtended by the convergent sides of the serration (α), is at most twice the critical angle of internal reflection of the material of the light transmissive layer.

17. An integrated optical component according to claim 10 wherein the transmissive layer is of silicon.

18. An integrated optical component according to claim 17 being a silicon-on-insulator device.

19. An integrated optical circuit formed on an optical chip, comprising:
    a light transmissive layer;
    one or more optical devices integrated in said layer; and
    at least one serration formed along an edge of said layer arranged such that stray light lost from the one or more optical devices incident upon said at least one serration at the edge of the layer undergoes multiple reflections within the serration, each reflection attenuating the light.

20. An integrated optical component comprising a light transmissive layer, the said layer having at least one serration formed along an edge thereof, the serration being adapted to induce multiple reflection of light propagating in the light transmissive layer and hence attenuate that light, wherein the angle subtended by the convergent sides of the serration (α) is less than twice the critical angle of internal reflection of the material of the light transmissive layer.

21. An integrated component, comprising:
    a light transmissive layer including at least one waveguide and at least one active optical component, the waveguide being adapted to direct light to the component;
    the light transmissive layer having at least one serration formed along an edge thereof, wherein the angle subtended by the convergent sides of the serration (α) is less than twice the critical angle of internal reflection of the material of the light transmissive layer.

22. An integrated optical component comprising a light transmissive layer, the said layer having at least one serration on substantially all edges of the said layer.

23. The component of claim 22, wherein the serrations are arranged non-uniformly.

24. The component of claim 22, wherein the angle subtended by the convergent sides of the serration (α), is at most twice the critical angle of internal reflection of the material of the light transmissive layer.

25. An integrated optical component, comprising:
    a light transmissive layer, the said layer having at least one serration formed along an edge, wherein the at least one serration is adapted to induce multiple reflective and refractive processes on light propagating in the light transmissive layer to attenuate the light.

26. The component of claim 25, wherein the angle subtended by the convergent sides of the serration (α), is at most twice the critical angle of internal reflection of the material of the light transmissive layer.

27. An integrated optical component, comprising:
    a light transmissive layer, the said layer having at least one serration formed along an edge of the said layer, wherein the at least one serration is rounded and wherein the angle subtended by the convergent sides of the serration (α), is at most twice the critical angle of internal reflection of the material of the light transmissive layer.

* * * * *